March 13, 1956

S. M. STEVENS 2,738,197

APPARATUS FOR HANDLING AND INSPECTING
ROLLER-LIKE OBJECTS

Filed July 14, 1952

INVENTOR.
SAMUEL N. STEVENS,
BY
*Schley Nash & Jenkins*

ATTORNEYS.

March 13, 1956 S. M. STEVENS 2,738,197
APPARATUS FOR HANDLING AND INSPECTING
ROLLER-LIKE OBJECTS
Filed July 14, 1952 2 Sheets-Sheet 2
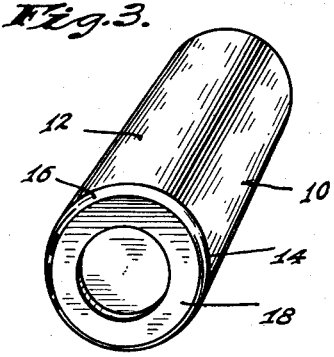
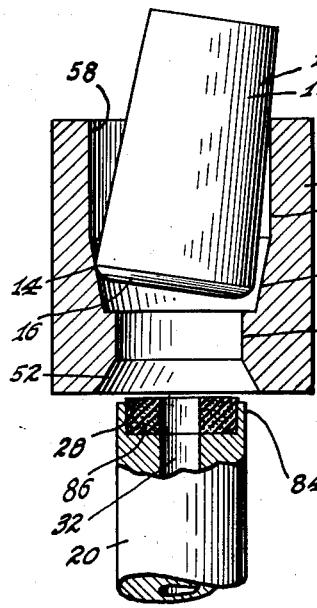
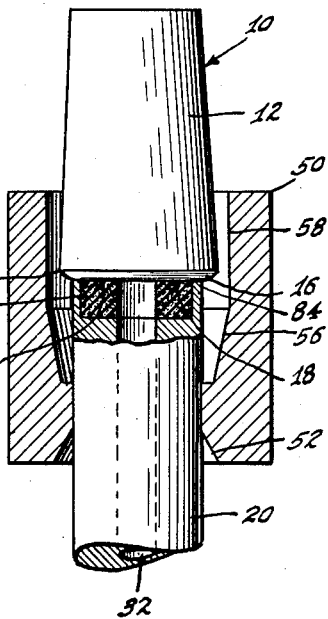
INVENTOR.
SAMUEL N. STEVENS
BY
ATTORNEYS.

United States Patent Office 2,738,197
Patented Mar. 13, 1956

2,738,197

APPARATUS FOR HANDLING AND INSPECTING ROLLER-LIKE OBJECTS

Samuel N. Stevens, West Lafayette, Ind., assignor to The Timken Roller Bearing Company, Canton, Ohio, a corporation of Ohio Application July 14, 1952, Serial No. 298,689

14 Claims. (Cl. 279—3)

This invention relates to apparatus for handling bearing rollers and other like objects, as for inspection or light work operations thereon, especially to a vacuum chuck for such objects and to means for locating an object on such a chuck. The invention is especially applicable to chuck by its end face an object which has concentric end and side surfaes of generation. It is of particular use in inspection apparatus, as exemplified in my copending application Serial No. 250,338, filed October 8, 1951.

It is the object of the invention to provide a chuck which will hold an object such as a bearing roller by its end face, as for inspection of or light work operations on its side surface, and especially to provide such a chuck in which the object is held thereon by vacuum. It is a further object of the invention to provide means to accurately locate an object such as a bearing roller on a chuck or other holder in a predetermined erect and centered position. It is an object of the invention to provide chucking and locating mechanism which cooperates in an inspection operation to provide a supplemental inspection function. It is a further object of the invention to provide apparatus for positioning an object such as a bearing roller upon a chuck for an inspection or light work operation, and for removing the object therefrom.

In accordance with the invention, a chuck is provided, preferably at the end of a rod-like spindle or holder, which has a seat to receive the end face of an object such as a bearing roller, to hold it on a predetermined axis and to make sealing engagement therewith, and vacuum is applied, as through a central bore in the chuck, to hold the object in sealed and supported engagement with the chuck. The chuck seat is desirably formed to fit the shaped end face of the roller. In its preferred form, the chuck has an annular portion which makes metal to metal locating contact with the object, and a concentric resilient portion which makes sealing contact therewith.

For locating an object such as a bearing roller on a chuck at the end of a rod-like spindle or other holder, a locator collar is provided which has a tapered or conical seat to receive the object and to make continuous line or narrow-surface contact with the object at an edge portion thereof having a fixed relationship to the end face which is to be seated on the chuck. The collar has a lower portion adapted to inter-engage the chuck and predetermine the relative position therebetween, and desirably has an upper portion adapted to hold the object in generally upright position in the seat. The lower portion which inter-engages the chuck is adapted to make a substantial seal between the locator and the chuck, and with these parts in sealing engagement and with an object resting on the conical seat of the locator, vacuum is applied to the space within the locator between the chuck and the object and the chuck and locator are relatively moved co-axially to bring the chuck into supporting engagement with the object. If the object is misalined in the locator, this operation brings it to the true alined position. I believe that ordinarily the object is alined by air pressures resulting from the vacuum, before the object is engaged by the chuck. If not, however, the combination of the vacuum with the initial engagement of the spinning chuck with the object in the conical seat produces the desired alining effect. Use of the locator in many chucking operations shows that the overall result is a reliable centering and alining effect. The locator can then be relatively moved axially of the chuck-carrying spindle, to expose the entire side surface of the object for inspection or light work operations. The locating operation is sensitive to inaccuracies of the located object, and hence effects a supplementary inspection operation.

At the completion of the inspection or other operation on an object held by a vacuum chuck, the object is removed therefrom by coordinated operation of a vacuum-breaker and an ejection mechanism.

The accompanying drawings illustrate my invention.

In such drawings:

Fig. 3 is an isometric view of a bearing roller;

Fig. 4 is an axial sectional view of a preferred form of vacuum chuck and locator in an initial position of the locating operation;

Fig. 5 is a view similar to Fig. 4 with the parts in intermediate stage of the locating operation; and Fig. 6 is a view similar to Fig. 4 with the parts in a later stage of the locating operation.

Figure 1:
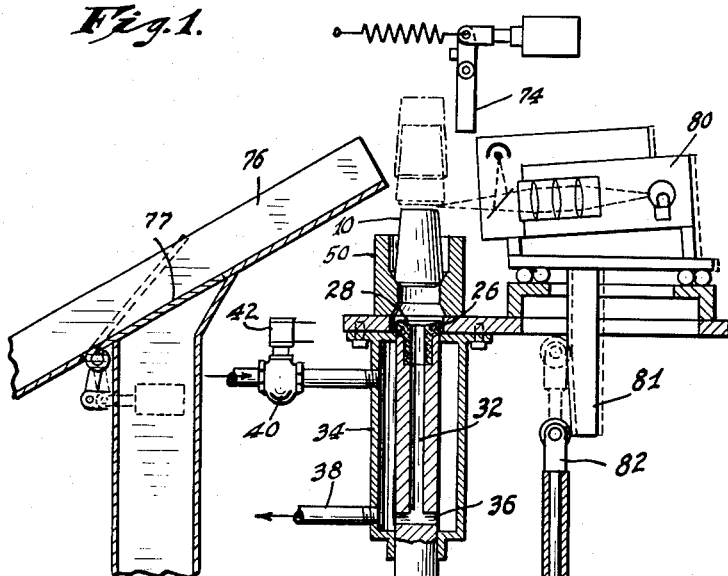
Fig. 1 is a somewhat diagrammatic side elevation, partly in section, of apparatus for inspecting bearing rollers, as disclosed in my co-pending application Serial No. 250,338, and in which the chuck is moved axially with respect to a stationary locator.

The mechanism shown in Fig. 1 is adapted to inspect tapered bearing rollers 10 such as shown in Fig. 3. Such rollers 10 have a frusto-conical finished side surface 12 which is the surface inspected in the mechanism of Fig. 1. The lower edge of the conical surface 12 forms a corner 14 with a curved surface 16, usually a cast surface but quite accurate in an acceptable roller. I desirably use the corner 14 as a locating reference. The lower or large end of the roller 10 has a finished annular end face 18, usually of conical or spherical configuration, and I use this finished end face to support the roller 10 on the chuck. When the roller is thus supported, the entire side surface 12 is exposed for inspection or light work operations.

The mechanism shown in Fig. 1 comprises a main spindle 20 driven by a motor 22 through a telescoping coupling 24. Its upper end is provided with a chuck for the end face 18 of the roller, to recevie and support the roller 10. As shown in Fig. 1, the chuck comprises an insert 26 whose upper face is formed as a seat 28 for the roller. The insert is made of stiff rubber or similar material which makes good frictional engagement with steel and which is of sufficient rigidity to accurately support the roller 10. The insert 26 and the upper end of the spindle 20 is drilled to form a central passage 32, and the spindle extends through a vacuum chamber 34 with which the drilled passage 32 communicates through a cross hole 36. The vacuum chamber 34 is connected to a suitable vacuum pump by a pipe 38 and is desirably also provided with means to break the vacuum. As shown, this is a normally closed vacuum-breaking valve 40 operated by a solenoid 42 and adapted to admit air to the vacuum chamber 34.

Above and co-axial with the spindle 20 there is a locator 50, shown in enlarged section in Figs. 4 to 6. It desirably has a flared inlet throat 52 at the bottom, and an intermediate cylindrical portion 54 adapted to receive the spindle 20 with a close running fit. Above this there is a conical locating seat 56, and above this a cylindrical guide portion 58 adapted to support the roller 10 in a generally upright position on the conical seat 56.

The spindle 20 is arranged to be reciprocated vertically from a lowermost position shown in full lines to an upper position shown in dotted lines. To effect reciprocation, the spindle is rotatably carried by a collar 60 connected to an actuating lever 62 which is linked to a crank 64 on a shaft 66 driven by a motor 67 through a gear set 68. The shaft 66 desirably may carry suitable timing and control cams 70 which respectively actuate switches 72.

Ejection mechanism is provided to eject a roller from the spindle, as at the upper end of its reciprocating movement. A solenoid operated lever 74 is shown for this purpose, and a chute 76 is provided to receive the ejected roller. The chute may be provided with one or more solenoid operated classification doors 77 to divert an inspected roller to a classification determined by the inspection operation. Ejection is effected by coordinate actuation of the vacuum breaking valve 40 and the ejection lever 74, as by one of the switches 72, as the spindle reaches its uppermost position.

An optical inspection head 80 inspects the spinning roller as it is carried upward by the spindle 20. As shown, the inspection head is like that of my aforesaid co-pending application and projects a converging beam of light onto the side surface of the rising and spinning roller, and includes a phototube carried by the inspection head and responsive to light reflected from the side surface. To maintain the head at a fixed distance from the sloping side surface of the spinning conical roller, the inspection head is mounted for lateral reciprocation with respect to the axis of the spindle 20, and its reciprocating movement is effected by a cam 81 carried by the head 80 and actuated by a cam follower driven from the lever 62.

In the operation of the mechanism of Fig. 1, the spindle moves first to close the lower end of the locator, then to pick up the roller therefrom, then to carry the roller through an inspection zone, and then to an ejection position.

Figure 2:
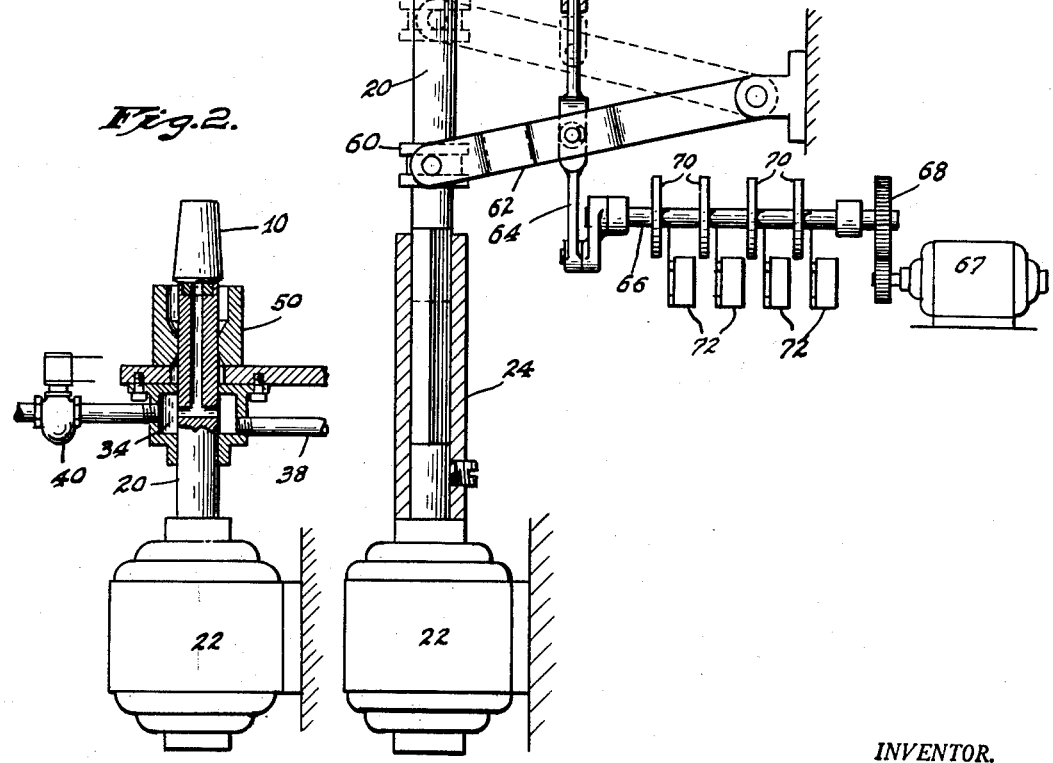
Fig. 2 is a similar view showing an arrangement in which the chuck undergoes no axial movement and the locator is moved relatively thereto, and showing a preferred form of chuck.

In the modification shown in Fig. 2, the spindle 20 is directly connected to the motor 22 and undergoes no vertical reciprocation. The vacuum chamber 34, which in the absence of reciprocation of the spindle 20 is shorter than in Fig. 1, is similarly connected to a vacuum line 38 and to a vacuum-breaking valve 40. In this case, the locator 50 is movable axially with respect to the fixed spindle 20. The locator 50 can be moved manually, or may be part of or moved by a suitable automatic mechanism.

The preferred form of chuck, shown in Figs. 2, 4, 5, and 6, comprises an outer narrow annular rim 84 adapted to make metal-to-metal contact with the end face of the roller 10 and to provide a rigid locating seat for that roller 10. Within the annular metal seat 84, and seated in a counter-bore in the upper end of the spindle 20, is a concentric resilient sealing member 86 which normally stands slightly above the metal seat 84 but is compressible when a roller is pulled against it by the vacuum to permit that roller to seat on the metal seat 84. In this case, the locating function of the chuck is performed by the annular metal seat 84 while the sealing and driving functions of the chuck are performed mainly by the resilient sealing member 86.

The locator 50 and its operation is best shown in Figs. 4 and 6. Its conical locating seat 56 is positioned above the spindle-receiving cylindrical portion 54, and diverges upwardly from the axis of the locator at a small angle. It is preferable to use an angle less than 30°, and the angle used depends on the disposition of surfaces adjacent the reference portion or corner of the object and on the tolerance to which the objects are made. With conical bearing rollers having an included cone angle of about 10°, I have found it desirable to use a locator seat whose wall diverges from its axis by an angle of 5°. The seat is of a size to be engaged by the corner 14 of the roller and to support the roller thereby.

The locating operation of the chuck and locator is as follows: When a roller 10 is placed in the locator 50 with its big end down and with the locator spaced from the chucks so that no vacuum is applied within the locator, the roller rests on the seat 56 and is held in an approximately upright position by the surrounding cylindrical guide portion 58, as shown in Fig. 4. If the locator and chuck are now relatively moved toward each other, to bring the upper end of the chuck into sealing engagement with the cylindrical portion 54 of the locator 50, with vacuum being drawn through the central bore 32, vacuum is supplied within the locator between the chuck and the roller 10 in the locator. If the roller is misaligned, as in Fig. 4, air is drawn downwardly past it by the vacuum, and I believe the resulting air pressures on the roller cause the roller 10 to move in the seat 56 to an upright centered position, where its corner 14 makes full line contact around the whole circumference of the conical seat 56. Relative movement of the chuck and locator is now continued, to bring the chuck against the roller. If the roller has not already been alined by the air as noted above, the initial contact of the chuck with the roller, while the chuck is spinning co-axial with the conical seat in which the roller rests, combines with the downward pull of the vacuum on the roller to cause the roller to take a true alined position. Meanwhile, the sealing member 86 engages the lower face of the roller, seals the roller to the chuck, and the vacuum compresses the resilient sealing member 86 and draws the roller firmly against the annular locating seat 84. The roller is then held firmly on the chuck. Relative movement of the chuck and locator is continued to carry the roller to a fully exposed position. In Fig. 1 this is accomplished by the continued upward movement of the spindle 20 through the locator 50. In Fig. 2 it is accomplished by lowering the locator 50 to the position of rest on the supporting table as shown in Fig. 2.

The chuck and locator are especially advantageous for use in inspecting bearing rollers, for not only does the locator properly position a true roller co-axially on the chuck, to be held thereby during the inspection operation, but the locator itself performs an inspection operation. If the roller is inaccurate so that for any reason the corner 14 does not bear a proper relation to the end face of the bearing surface of the roller, the roller will be placed on the chuck in a misaligned or off-center position, and this will produce an inspection response indicating the inaccuracy of the roller.

I claim as my invention:

1. Handling apparatus for rollers having a side bearing surface and a narrow annular end face which has a predetermined relation to the bearing surface, comprising a spindle, a seat at the end thereof to receive the end-face of the roller in locating and sealing engagement, and means to apply vacuum within said seat to hold the object thereon, said seat having a rigid outer locating face adapted to engage outer portions of the roller end-face in rigid locating engagement, and yielding annular seal face within said locating face adapted to make sealing and frictional engagement with inner portions of said roller end-face, said seal face normally standing above said locating face and being yieldable to the level of the outwardly adjacent locating face to permit the vacuum to draw the roller into engagement with the locating face.

2. Handling apparatus for rollers having a side bearing surface and a narrow annular end face which has a predetermined relation to the bearing surface, comprising a spindle, a seat at the end thereof to receive the end-face of the roller in locating and sealing engagement, and means to apply vacuum within said seat to hold the object thereon, said seat having a rigid outer narrow annular locating rim adapted to engage an outer portion of the annular end face of the roller in rigid locating engagement, and a yielding annular seal face within said rim and adapted to make sealing engagement with an inner portion of said roller end face, said seal face normally standing above said locating rim and being yieldable to the level of the adjacent rim to permit the vacuum to draw the object into engagement with the locating rim.

3. Handling apparatus for rollers having a side bearing surface and a narrow annular end face which has a predetermined relation to the bearing surface, comprising chucking means having an outer narrow annular locating face adapted to receive an axial engagement an outer portion of the end face of a roller, and means to apply vacuum to hold the roller against the locating face, said vacuum applying means including a seal face concentric within said locating face and normally standing thereabove but yieldable to the level of the outwardly adjacent locating face to permit the vacuum to draw the roller into engagement with the locating face.

4. Handling apparatus for rollers and the like, comprising a spindle, a seat at the end thereof to receive the end face of a roller-like object, a locator sleeve relatively movable co-axially with respect to the spindle in sealed relation therewith, a conical seat therein to support the roller-like object by reference portions radially outward from its seat-engaging face, and means to apply vacuum centrally through the spindle seat, whereby when said locator is brought into sealed relation with said spindle the vacuum acts on a roller-like object seated in said conical-locator seat.

5. Handling apparatus for rollers and the like having an end face and a surrounding concentric corner portion, comprising a spindle, a seat at the end thereof to receive a roller end face, a locator having a bore to pass the spindle in sealing relation therewith, a conical seat therebeyond and diverging outwardly therefrom at a small angle from the axis thereof, said conical seat being of a size to support a roller-like object by the corner portion thereof, said spindle and locator being relatively movable to a position in which said spindle closes the bore of said locator, and means to cause fluid flow into said locator through the conical seat thereof to locate a roller-like object therein, said spindle being relatively movable axially of the locator to engage an object so located.

6. Handling apparatus for rollers and the like having an end-face and a surrounding corner portion, comprising a locator, a conical seat therein, the wall of which lies at a small angle to the axis thereof and which is adapted to receive a roller-like object and to be engaged in substantially line contact by the corner portion thereof, means to cause fluid flow toward the small end of said conical seat to position a roller-like object therein, and a chuck relatively movable axially of the locator to pick up the object from the locator seat.

7. Handling apparatus for rollers and the like comprising a locator, a conical seat therein, the wall of which lies at a small angle to the axis thereof and which is adapted to receive a roller-like object, means to cause fluid flow toward the small end of said conical seat to position a roller-like object therein, and a chuck relatively movable axially of the locator to pick up the object from the locator seat.

8. Handling apparatus for rollers and like objects having an end bounded by a circular corner edge, comprising a locator, a conical seat therein the walls of which lie at a small angle to the axis thereof and which is adapted to receive, engage, and support the circular corner edge of an object therein, and means to cause fluid flow toward the small end of the seat to position the object therein.

9. Handling apparatus for rollers and the like, comprising a locator, a conical seat therein the wall of which lies at a small angle to the axis thereof and which is adapted to receive a roller-like object, a bore at the small end of said seat, a vacuum chuck having an end seat for the end face of a roller-like object and means to apply vacuum through said seat, said chuck being relatively movable into the locator bore to close the same and draw fluid toward the small end of said locator seat to locate a roller-like object therein, and then to pick up from said locator seat the located object.

10. Handling apparatus as defined in claim 9 with the addition of means to relatively move the locator and chuck to carry the chuck through the locator to pick up from said locator seat an object located therein and to carry the same to a work position beyond the locator.

11. Handling apparatus as defined in claim 10 with the addition of means operable subsequent to movement of the chuck to said work position to break the vacuum to said chuck and eject the roller therefrom.

12. Inspection apparatus for bearing members having a tapered side bearing surface and an annular end face in predetermined relation to the side surface, comprising a spindle, a chuck to hold a member in coaxial relation on the spindle, an inspection head for inspecting the side surface of the chucked roller, means to move the spindle axially to carry the member through an inspection movement with respect to the inspection head, and means operating in synchronism with said spindle movement to move the head toward and from the spindle axis to maintain a constant distance between the tapered surface and the head during such axial spindle movement.

13. Inspection apparatus for bearing rollers and the like having a longitudinally extending surface to be inspected and having an end face in cooperative relation to said surface, comprising a spindle, a vacuum chuck on said spindle to hold and locate a roller by its end face and coaxial with the spindle, means to apply vacuum to said chuck to hold a roller thereon, inspection means responsive both to surface variations and misalinement of the surface of a roller carried by said chuck, means to relatively translate said spindle and said inspection means to pass the roller through an inspection position with respect to the inspecting means, and means to break the vacuum and eject the roller from the chuck, said last-named means operating in timed relation with said translation movement and subsequent to passage of the roller through said inspection position.

14. Inspection apparatus as defined in claim 13 in which said relative translation means comprises means for axially reciprocating the spindle from an initial roller-receiving position, through an inspection stroke, to an ejection position, said inspection means being operable as the spindle carries a roller through the inspection stroke, and said ejection means being operable when the spindle is in ejection position.

References Cited in the file of this patent

UNITED STATES PATENTS

| | | |
|---|---|---|
| 904,679 | Bruton | Nov. 24, 1908 |
| 1,130,679 | Staunton | Mar. 2, 1915 |
| 1,640,567 | Firestone | Aug. 30, 1927 |
| 1,744,313 | Kadow | Jan. 21, 1930 |
| 2,051,695 | Glacy | Aug. 18, 1936 |
| 2,345,884 | Powers et al. | Apr. 4, 1944 |
| 2,398,959 | Petry | Apr. 23, 1946 |
| 2,405,483 | Abrams | Aug. 6, 1946 |

FOREIGN PATENTS

| | | |
|---|---|---|
| 1,014,564 | France | June 18, 1952 |